Jan. 24, 1967  R. A. ROBERT  3,299,810
DEVICES FOR THE CONTROL OF AN AERIAL BOMB OPERATION
Filed July 30, 1964  16 Sheets-Sheet 9

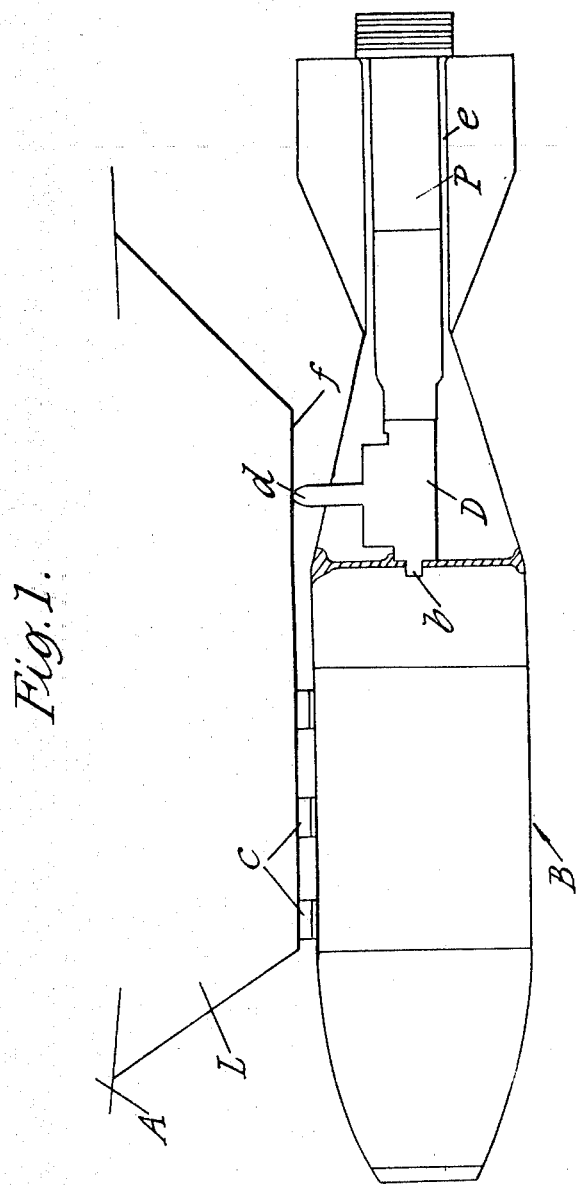

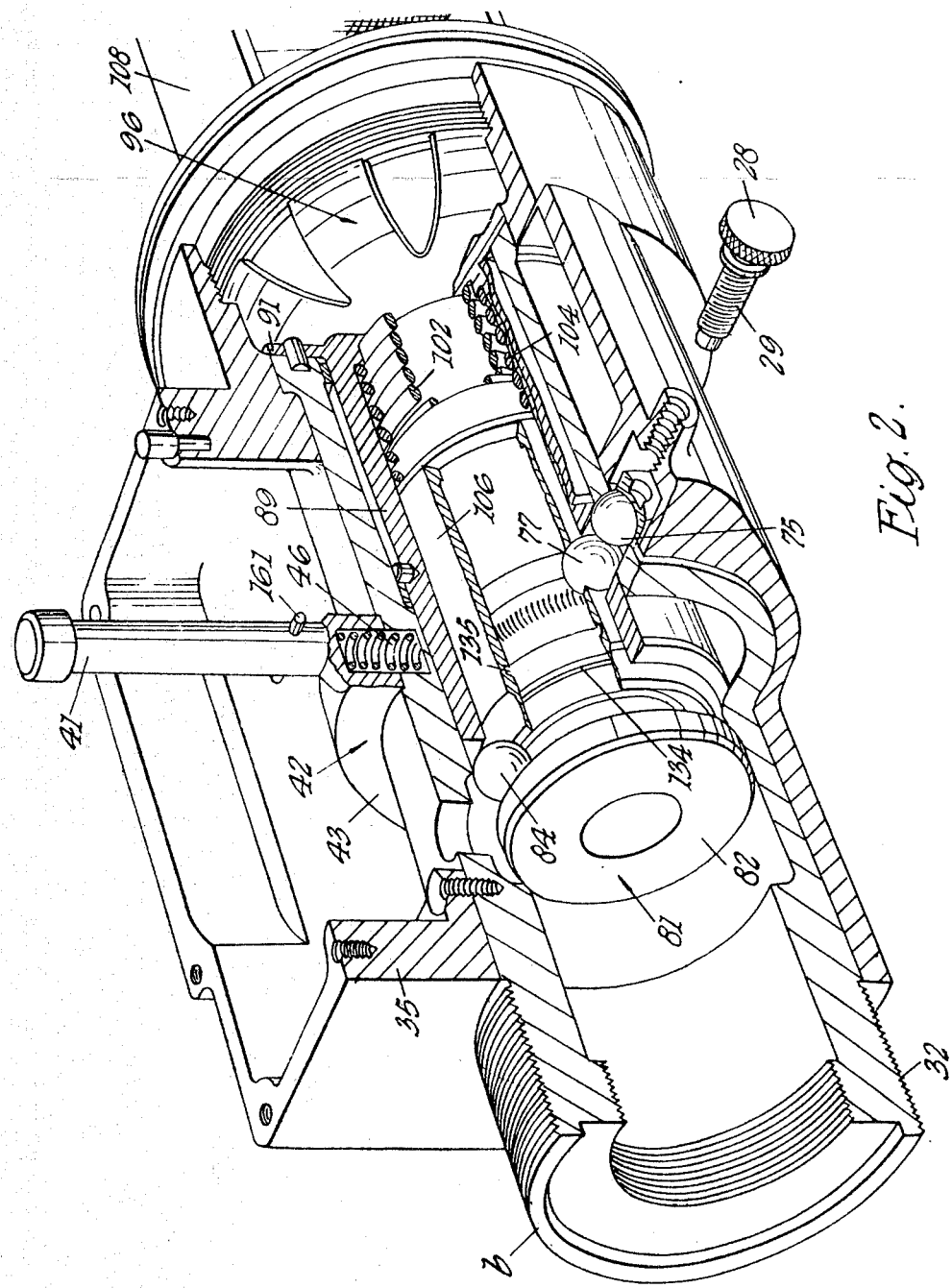

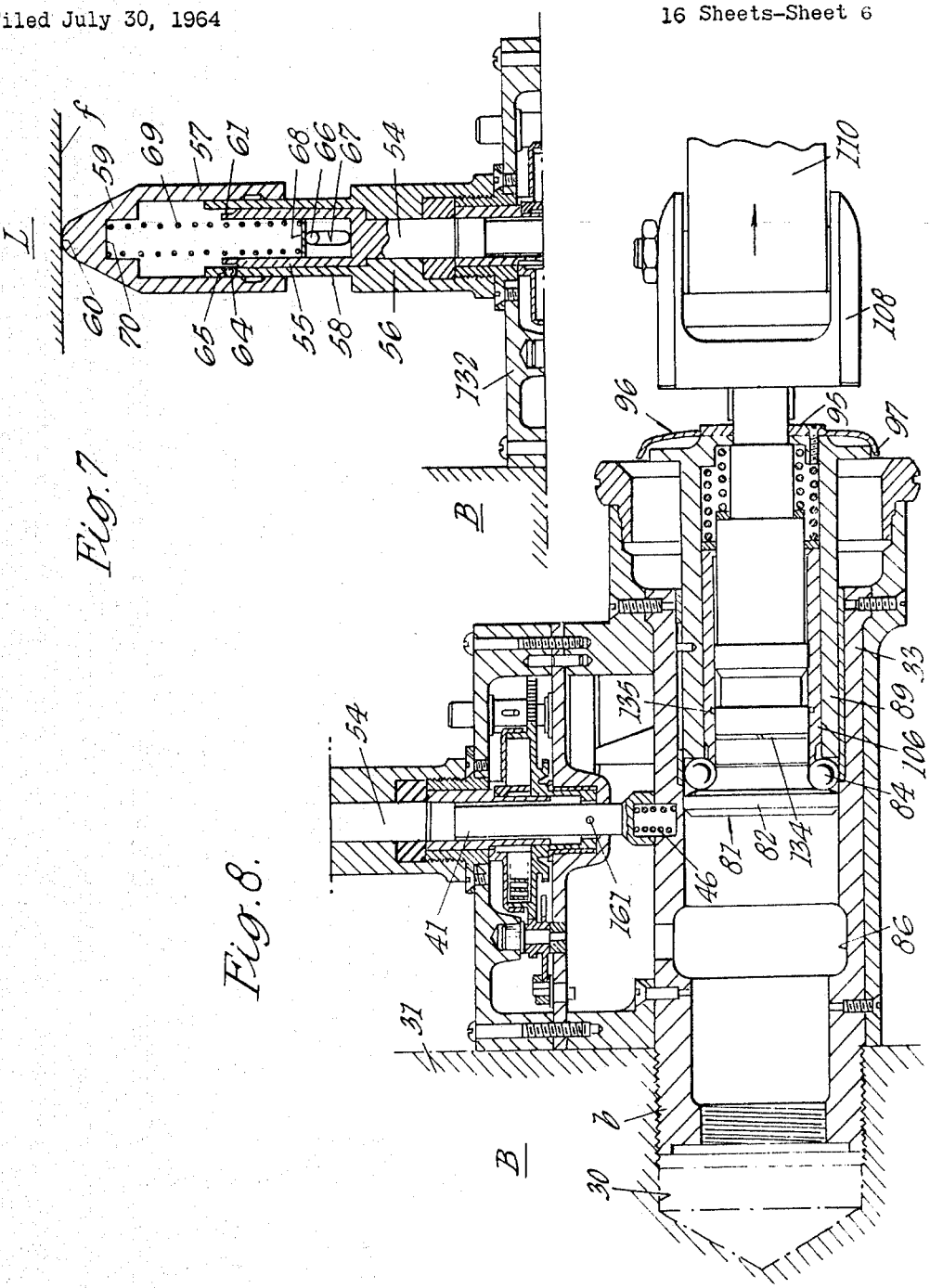

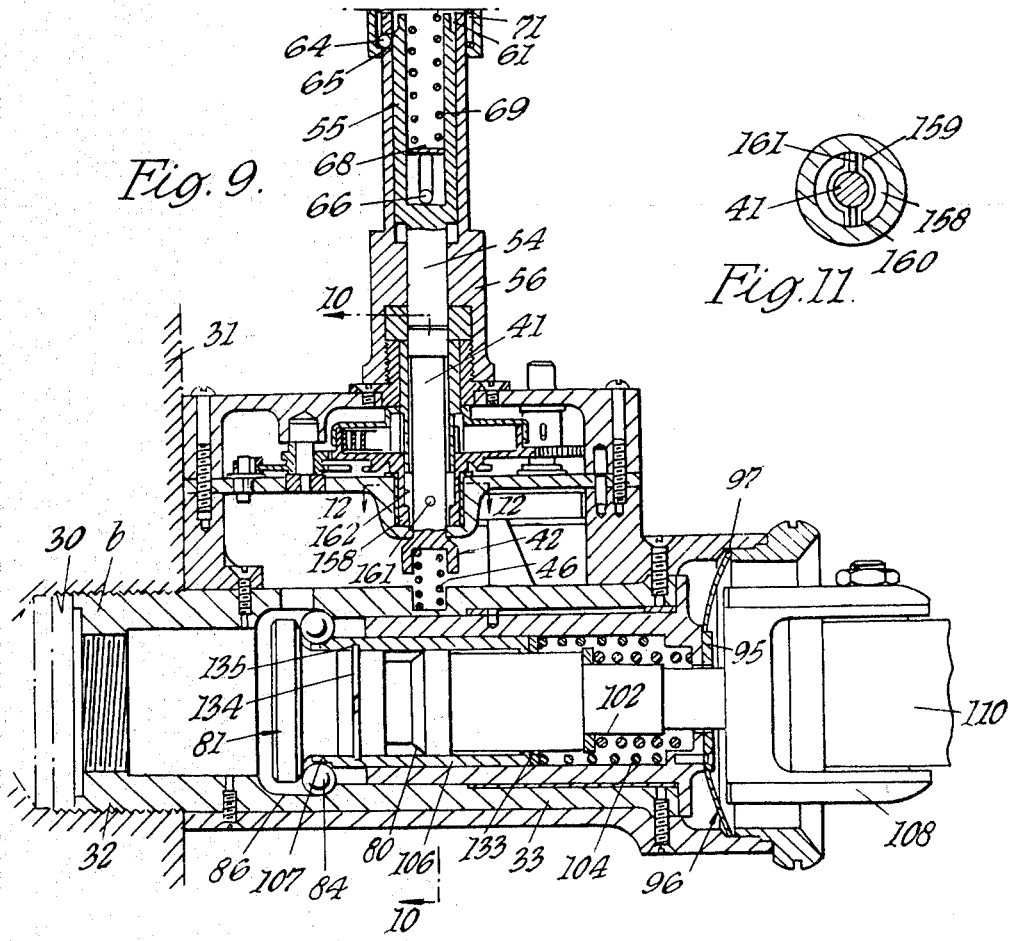
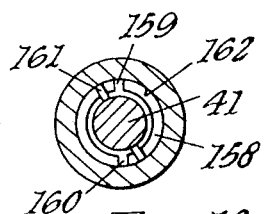
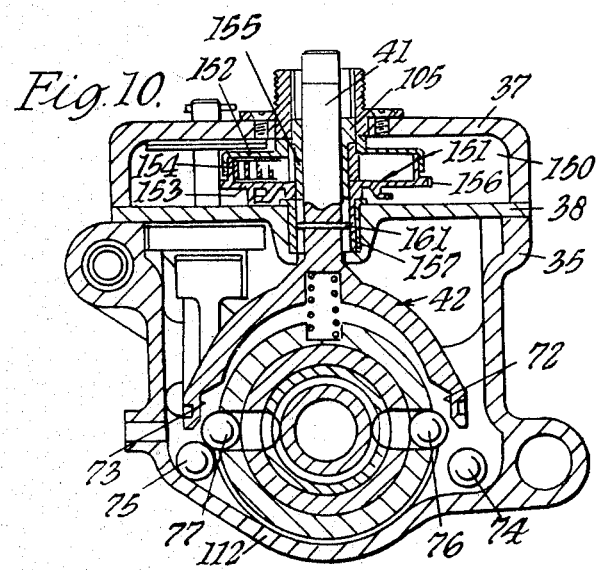

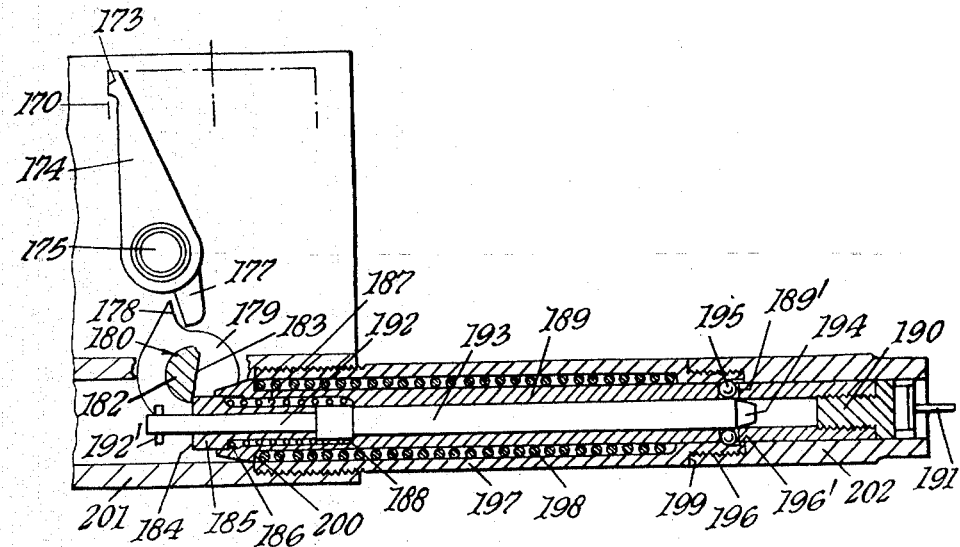
Fig. 15.
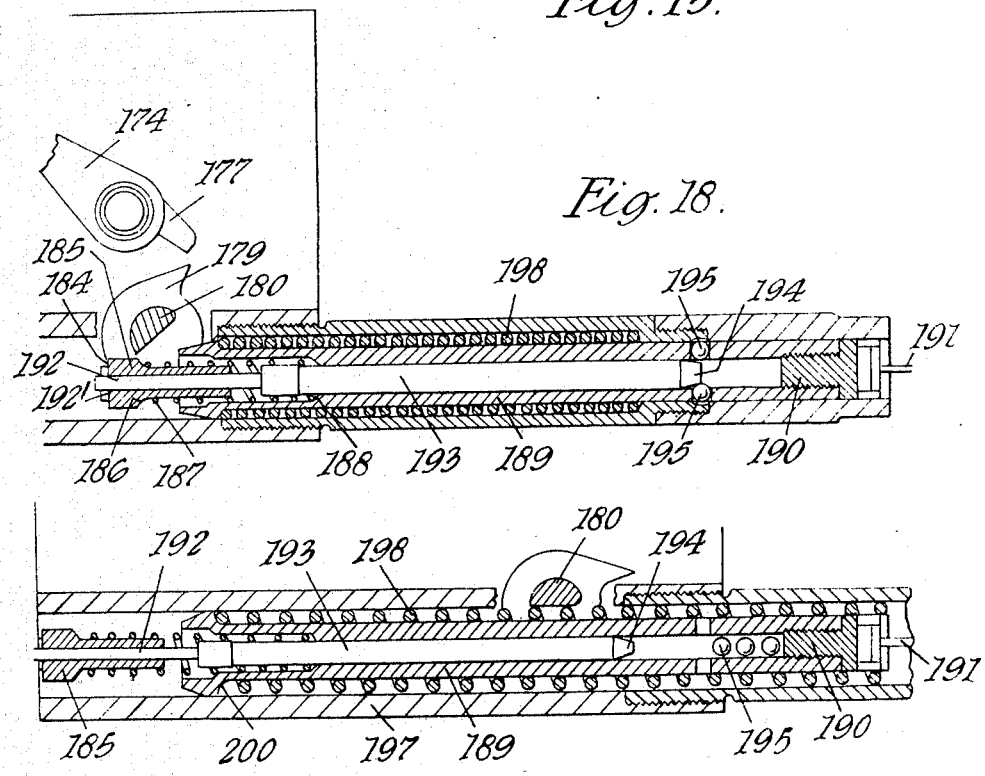
Fig. 18.
Fig. 19.

Jan. 24, 1967   R. A. ROBERT   3,299,810
DEVICES FOR THE CONTROL OF AN AERIAL BOMB OPERATION
Filed July 30, 1964   16 Sheets-Sheet 11
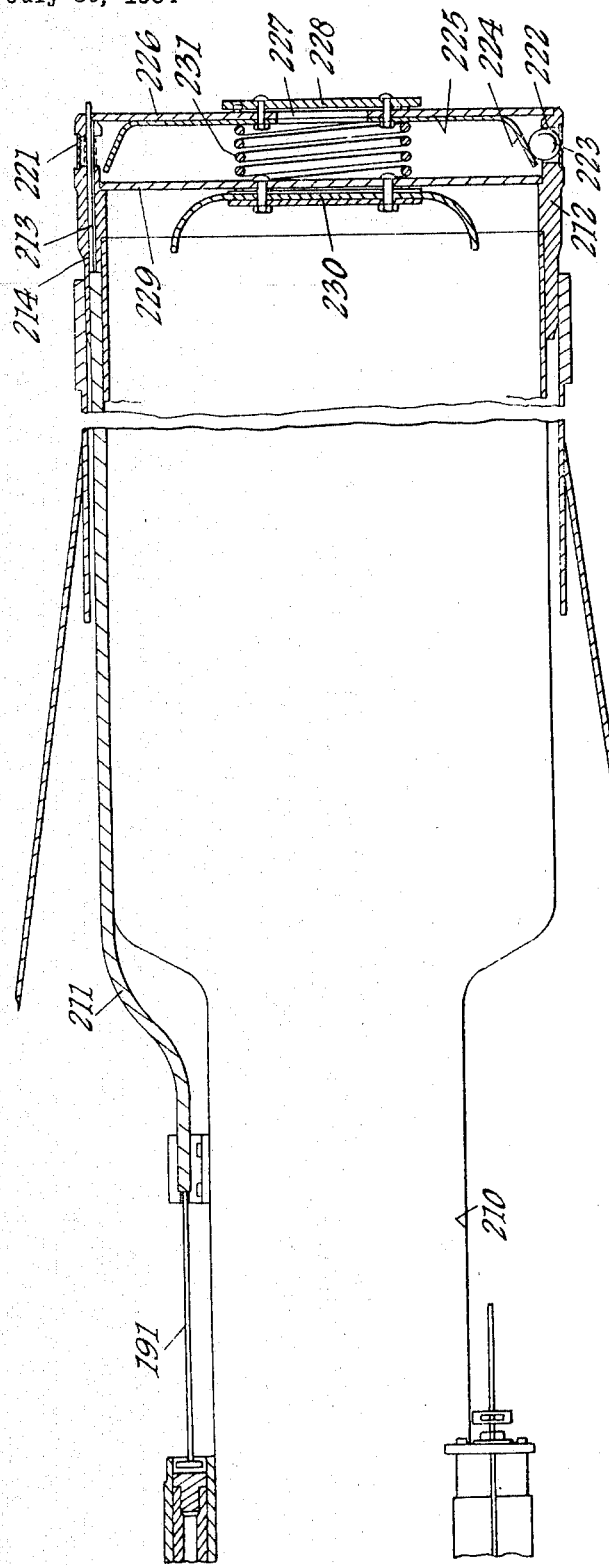
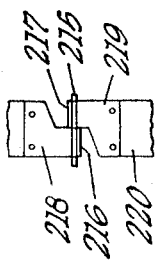

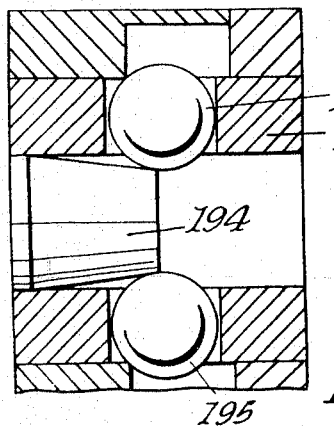
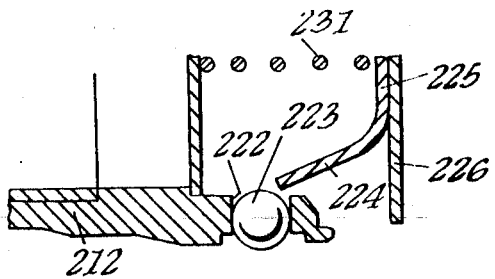
Fig.20. Fig.21.
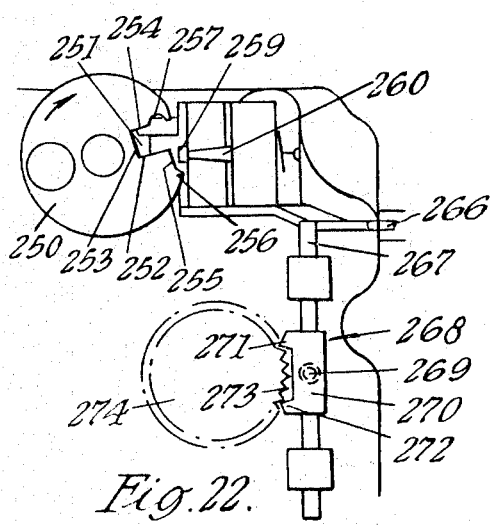
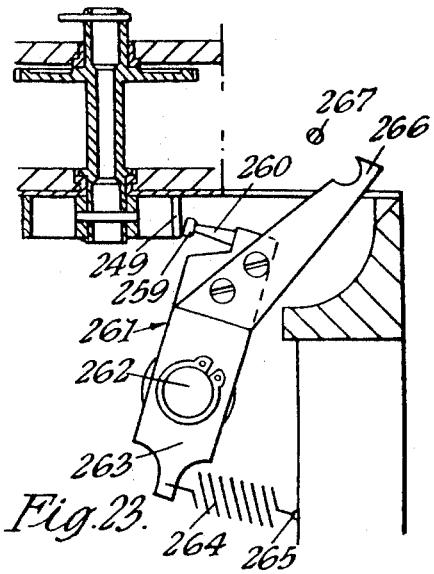
Fig.22. Fig.23.
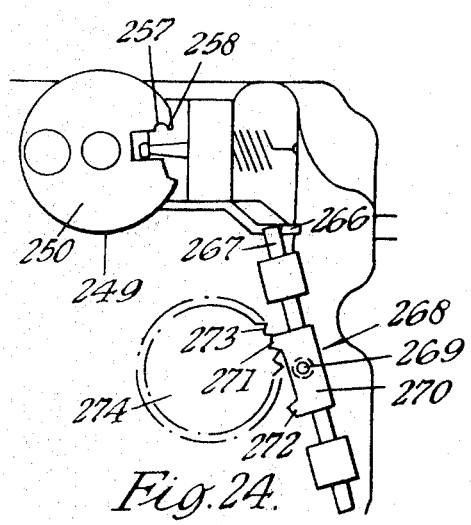
Fig.24.

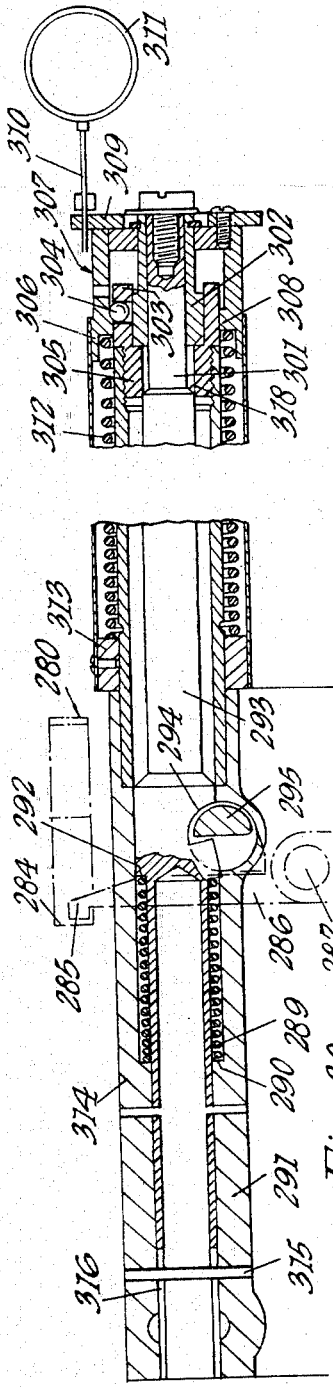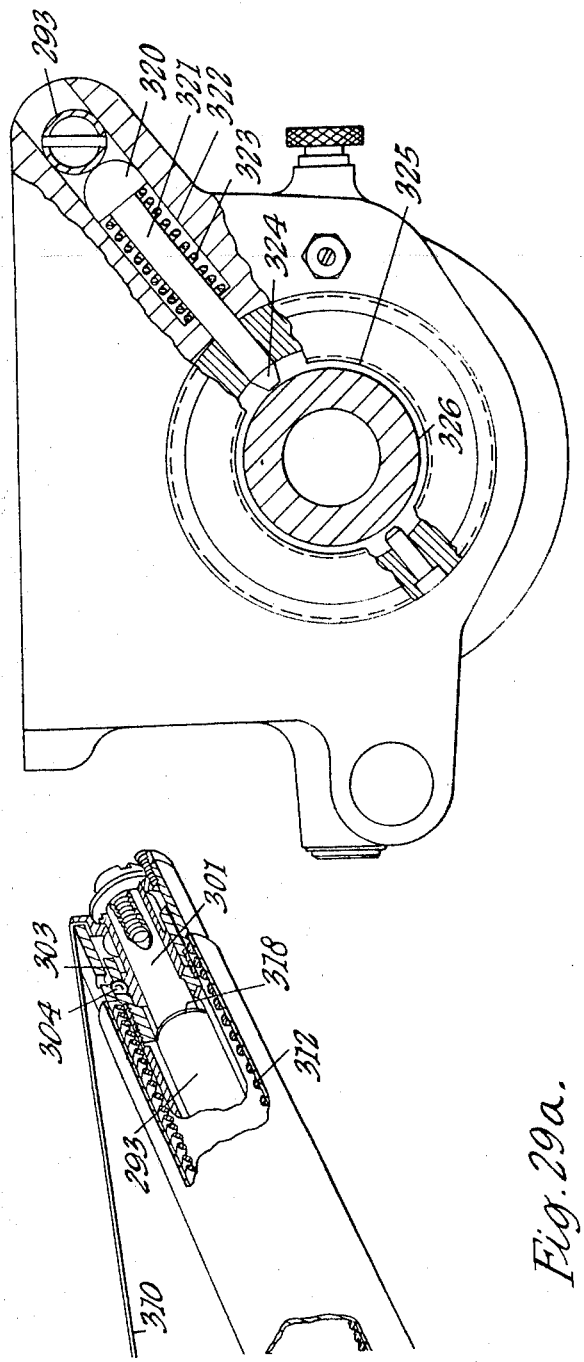

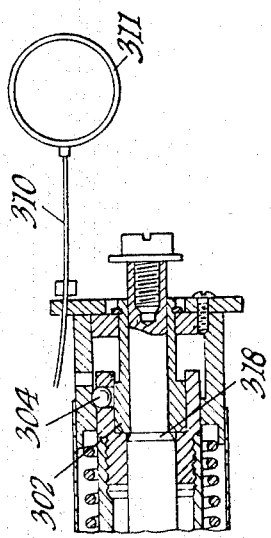
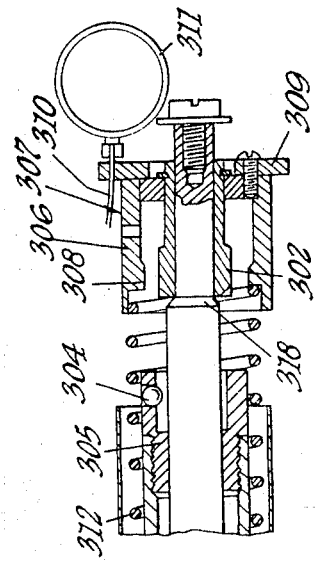
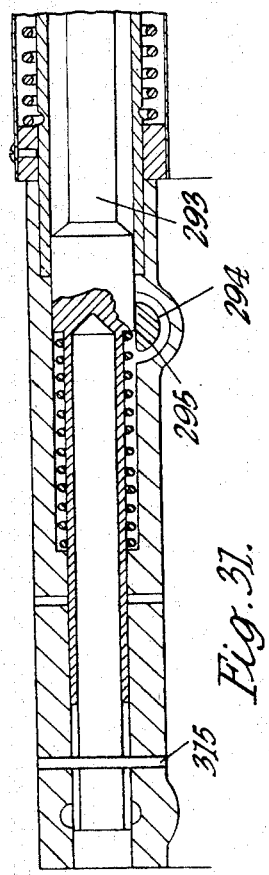
Fig. 31.
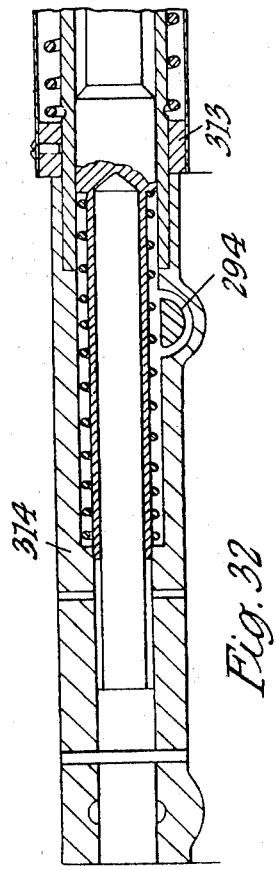
Fig. 32

United States Patent Office 3,299,810
Patented Jan. 24, 1967

3,299,810
DEVICES FOR THE CONTROL OF AN AERIAL
BOMB OPERATION
Roger Aimé Robert, 33 Blvd. d'Angleterre,
Le Vesinet, France
Filed July 30, 1964, Ser. No. 386,279
Claims priority, application France, Aug. 5, 1963,
943,777
21 Claims. (Cl. 102—4)

The present invention relates to apparatus adapted to control the operation of an aerial bomb.

In bombing operations, low-bombing is sometimes contemplated, on one hand because low-altitude flight enables the airplane to escape the supervision of enemy radars, and on the other hand, other things being equal, a good bombing accuracy may be achieved without resorting to complex pointing or correction aiming devices, the pilot of the airplane being thus in the position, if required, to effect the bombing himself.

Up to the present, however, low-bombing involves, both for the airplane and the crew, substantial risks on account, precisely, of the small distance existing between the airplane and the bomb at the instant of the explosion of the latter, such a risk being greater if the bomb fuse is of the instantaneously operating type.

The invention relates more particularly to a bomb fitted with a parachute in order to provide, between the launching airplane at low altitude, and the dropped bomb, a comparatively considerable distance, for protecting the launching airplane from the consequential effects of the explosion of the bomb.

On one hand the provision of a parachute may constitute a source of difficulties, as for instance following an untimely release of the mechanism under the airplane. On the other hand, an incidental operation of the parachute is always a matter to be taken into consideration, thus preventing the same to serve the purpose for which it was provided.

It is therefore an object of the present invention to provide apparatus adapted to carry out low-bombing from an airplane under maximum efficiency conditions and with a minimum risk for both the airplane and its crew.

It is more particularly an object of the invention to preserve the airplane from the consequence of an untimely or advanced release of the parachute, of an unsufficient or delayed opening, or of snaking thereof, or of ripping.

It is a further object of the invention to provide apparatus which is able to initiate, at will, the explosion of the bomb by means of an instantaneous or a delayed fuse.

It is another object of the invention to provide such a control equipment which does not resort, for its operation, to an electric current, so that it does not introduce risk resulting from unexpected electrical phenomena.

It is also an object of the invention to provide apparatus adapted to be readily fitted on existing bombs and easily mounted on existing airplanes, by an unskilled personnel.

It is equally an object of the invention to provide apparatus for controlling the operation of an aerial bomb, which is of a light weight, of simple construction and operation, without any hazards, even under severe operating conditions.

The invention is characterized, in particular, by the following features, taken separately or in combination:

(1) Between the bomb proper and the parachute are provided connection means which remain inoperative as long as the bomb is not effectively dropped;

(2) The connection means enable the parachute and the bomb to effect a relative rotary movement about a longitudinal axis;

(3) The connection means, becoming operative at the instant of dropping of the bomb, comprise ball members which cooperate, simultaneously, with the assemblies of the parachute and the bomb and allow their relative rotation;

(4) The placing into operative position of the connection balls is controlled by the breaking of a mechanical contact between an element integral with the bomb and the bomb dropping gear secured to the airplane;

(5) The release of the parachute depends on the operation of a timing device;

(6) The timing mechanism is automatically started by mechanical contact loss between the bomb, and the airplane;

(7) The extraction of the parachute is caused by powerful resilient means which remain inoperative as long as the timing device has not operated during a predetermined duration;

(8) The putting into operating condition of said powerful resilient means is effected through resilient means of low energy, under the direct control of said timing device;

(9) The timing device is stopped after the release of the parachute;

(10) To this end, a lever cooperates with a disc member driven by the timing device and formed with a slot or notch wherein said level penetrates;

(11) The re-starting of the timing device depends on the deceleration of the bomb under the effect of the parachute;

(12) Said timing device is re-started only if the deceleration exceeds a predetermined value;

(13) The re-starting of the timing device takes place only if the deceleration exceeds a predetermined value during a predetermined interval of time;

(14) Means are provided to prevent any re-starting of the timing device, even under the effect of a very high deceleration, if the timing device has not re-started, after a given predetermined time interval, since its stopping;

(15) The effect of the deceleration on the timing device, for stopping the same, takes place by means of an anchor-regulator balance included in said timing device.

The invention will be best understood from the following description and appended drawings, wherein:

FIGURE 1 is a diagrammatic view, in elevation, partially in cross-section, of a bomb assembly according to the invention.

FIGURES 2 and 2a are a perspective view of a portion of the control device for the release of the parachute, with parts broken away.

FIGURE 7 is a cross-sectional view of the device adjacent the contacting element with the bomb carrier.

FIGURE 8 is a view similar to FIGURE 4, but for a different condition.

FIGURE 9 is a view similar to FIGURE 4, but for a different condition.

FIGURE 10 is a cross-sectional view along line 10—10 of FIGURE 9.

FIGURE 11 is a cross-sectional view along line 11—11 of FIGURE 4.

FIGURE 12 is a cross-sectional view along line 12—12 of FIGURE 9.

FIGURE 15 is a cross-sectional view of the device for the control of the parachute release.

FIGURE 16 is a cross-sectional view showing the parachute container.

FIGURE 17 is a front view of the connecting means.

FIGURE 18 is a view similar to that of FIGURE 15, but for a different condition.

FIGURE 19 is a similar view to that of FIGURE 15, but for a still different condition.

FIGURE 20 is a view, on an enlarged scale, of part of FIGURE 18.

FIGURE 21 is a partial cross-sectional view of the rear portion of the parachute container.

FIGURE 22 is a diagrammatic view of the device for the control, through deceleration, for re-starting again the timing device.

FIGURE 23 is a corresponding transversal cross-sectional view.

FIGURE 24 is a view similar to that of FIGURE 22, but for another condition.

FIGURES 29 and 29a are a perspective view, with parts broken away, of part of the device.

FIGURE 30 is a longitudinal cross-sectional view of device for the control of the arming of a fuse.

FIGURE 31 is similar to FIGURE 30, but for a different condition.

FIGURE 32 is similar to FIGURES 30 and 31, but for a still different condition.

FIGURE 33 is a transverse cross-sectional view of the control device for arming the base fuse.

Description and general operation

Figure 2A:
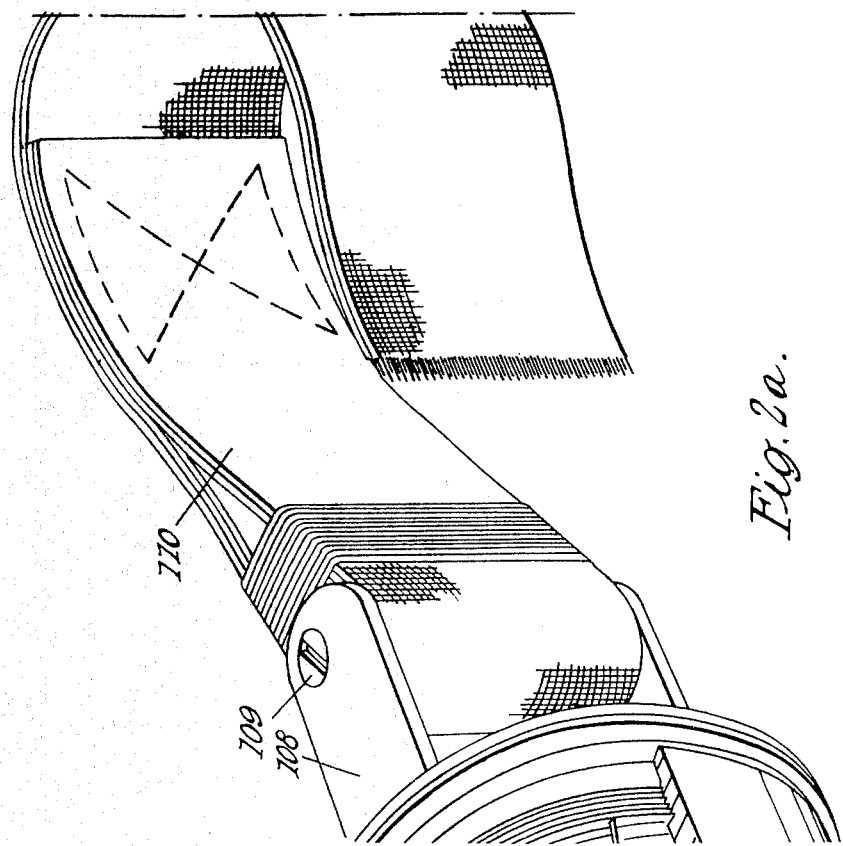

The bomb, designated by reference B (FIGURE 1) is suspended from the airplane A, for instance under a wing, by means of a bomb dropping gear L. At the rear side, the bomb proper carries, for instance through a threaded connector *b*, the equipment according to the invention, D, the latter including, at the rear side, an envelope, or container, *e*, containing a folded parachute P.

The device D is formed with a tip portion *d* which, as long as the bomb is not dropped, acts as a feeler and is applied against the bottom *f* of the bomb dropping gear. According to a feature of the invention, as long as the bomb is not dropped, the parachute P is not interlocked with the bomb, so that if for any reason, the parachute is extracted accidentally from its envelope, it separates from the airplane without exerting thereon any action, this on account of the fact that it is not interlocked with the bomb carrying equipment. Thus, the danger is avoided which would result from the sudden application of a high force resulting from the extraction and the unfolding of the parachute, should the latter be connected to the airplane via the non-dropped bomb, which might bring about an irremediable unbalancing of the system.

The invention also provides means whereby, on the other hand, as soon as the bomb is dropped—for instance by opening the suspension hooks indicated at *c*—the parachute becomes interlocked with the bomb, thus being ready to serve its purpose. Advantageously, the interlocking operation is controlled by simply disengaging feeler *d* from the bottom *f* of the bomb dropping gear.

Upon the parachute and the bomb being interlocked, it is provided, according to the invention, that the extraction of the parachute should take place only after a given predetermined time duration. Thus, during the first stage of the fall of the bomb, the latter, fitted with the equipment according to the invention, will drop without its contour being modified in any way (except for the unfolding of the tail fin in the case of a bomb including unfoldable fins), particularly without any extensions which form part of the parachute, so that there is no risk of any of such extension elements interfering with any part of the airplane.

The invention provides that after said predetermined time delay as described above, the extraction of the parachute is caused by powerful mechanical means.

Upon causing the projection relative to envelope *e* of an element forming part of the parachute, the extraction of the latter and its unfolding take place by the application of very high aerodynamic forces, and the open parachute exercizes a high deceleration effect on the bomb, the bomb thus moving rapidly away from the airplane which continues its flight.

Means are then provided, according to the invention, whereby the priming of the fuse or fuses incorporated in the bomb is initiated only if the latter is at a sufficient distance from the airplane for its explosion on the priming of its fuse does not risk or endanger the airplane. According to a particular feature, in this connection, the control of the priming of said fuse or fuses is ensured in a double way, by rendering it dependent not only on the magnitude of the deceleration, but also on the duration of a period during which a deceleration exceeding a predetermined value exists. This arrangement according to the invention renders thus the operation possibility of the bomb under the direct dependence of the distance separating the airplane from the bomb, the latter being primed only when said distance exceeds a predetermined value, the safety of the crew being thus directly tied up to the condition a non observance of which would result in a risk to the safety of the crew.

The invention also provides means such that, on the other hand, as soon as such a double requirement is fulfilled, the priming of the fuse or fuses of the bomb is ensured, the means resorted to to this end being such as to be operative with the highest degree of reliability.

The equipment according to the invention is, besides, arranged in such a manner as to adapt itself to the control of either an instantaneous priming of the fuses, or to a delayed priming of the latter.

Means are finally provided in order to avoid that an impact on the ground which might result in a very high deceleration could interfere with the normal operation of the safety means provided, responsive to the parachute deceleration, thus protecting the crew of the airplane against circumstances—no doubt exceptional—but the effects of which could be harmful.

Parachute and bomb connection

Figure 4:
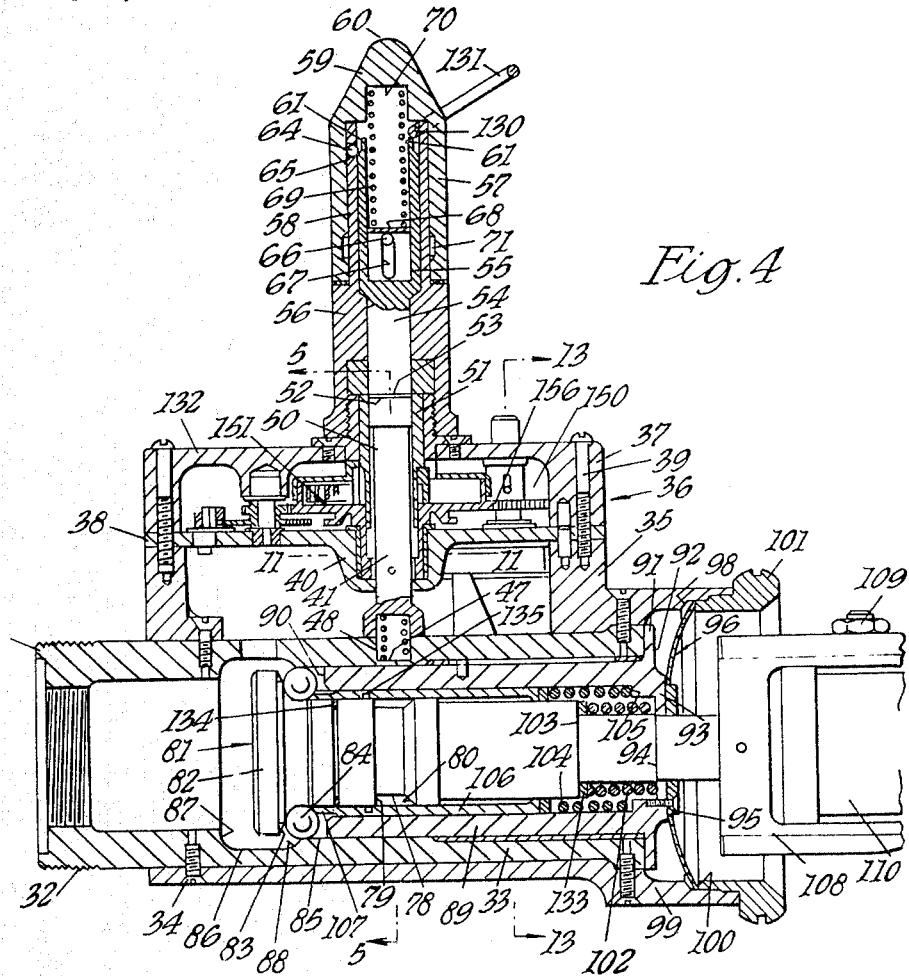
FIGURE 4 is a cross-sectional view of part of the device according to the invention, before being mounted on the airplane.
Figure 5:
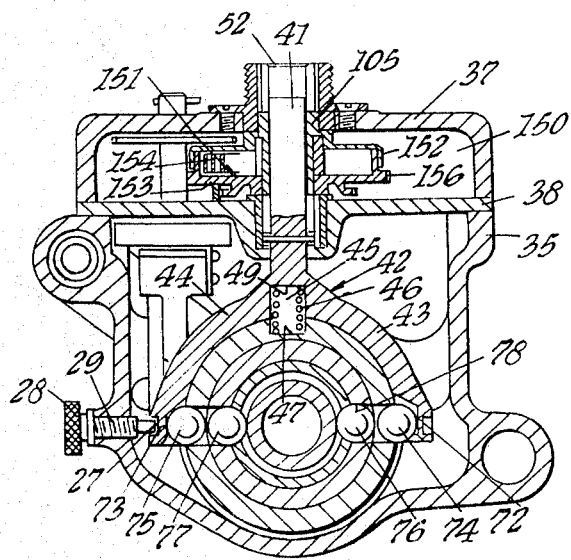
FIGURE 5 is a cross-sectional view along line 5—5 of FIGURE 4.

In a threaded bore 30 (FIGURE 8) of body 31 of the bomb B, substantially along the longitudinal axis of the latter, is secured, by means of a thread cutting 32 (FIGURE 4) formed thereon, a plug member *b* constituting the end portion of a sheath or sleeve 33 rendered integral with a casing 35 of the body 36 of the device by means of screws such as 34. Casing 35 is capped by a cover or cap 37 and, between the casing and the cap, there is inserted an intermediate transversal partition 38, said casing, cap, and partition being secured together by means of screws 39 (FIGURE 4). The intermediate partition 38 is formed with a central boss piece 40 provided for the passage, in slidingly guided relationship of a rod 41 forming part of a fork 42, as shown in FIGURE 5, the branches 43 and 44 of which extend substantially along a half-circumference. At the point of connection of these branches 43 and 44, the fork is formed with a cylindrical cavity 45 for accommodating a spiral spring 46 bearing, on one hand, against the bottom 47 of a cylindrical housing 48 of sleeve 33 and, on the other hand, on the bottom 49 of cavity 45. Rod 41 cooperates in abutment relationship, by its upper front face 52, with the lower front face 53 of a rod member 54 extended by a sleeve 55 and which is slidingly mounted in body 56 of end piece d. The latter is topped by a cap 57 (FIGURE 7) slidingly mounted relative to sheath or sleeve 58 extending body 56 and ending with an end portion 59 formed with a rounded tip 60 which, before dropping of the bomb, is in abutting engagement with bottom f of the bomb dropping gear L. Sleeve 55 is formed at its upper end, on its external face, with a shoulder 61 which serves to maintain one or a plurality of balls such as 64 located in holes 65 provided in sheath 58 (FIGURE 4). A transversal pin 66 is integral with the latter and traverses sleeve 55 through a buttonhole 67. Said pin serves as a stop for a washer 68 located inside said sleeve 55 and a weak spring 69 is inserted between said washer and bottom 70 of cap 57. The internal cylindrical surface of the latter is formed, towards its lower portion, with an annular groove 71.

Figure 6:
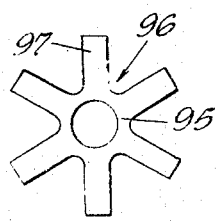
FIGURE 6 is a front view of a holding element.

The end portions of branches 43 and 44 of fork member 42 present recessed portions 72 and 73 (FIGURE 5) which serve as seats and which cooperate each with the external ball, respectively 74 and 75, of a pair of balls, the inner balls of which are indicated at 76 and 77. Before assembling casing 36 and the elements contained therein with the bomb and the bomb dropping gear, any displacement of fork 42 along the axis of rod 41 is prevented by a screw 28 with a threaded head 29 the end of which is inserted into a recess 27 of branch 44. In the stage before the dropping of the bomb, balls 76 and 77 are partially housed in an annular groove 78 (FIGURE 4), limited at the front by a transversal shoulder 79 and, at the rear, by a sloped shoulder 80, thus, shaped as a truncated cone, forming part of the external surface of a sliding member or piston 81. Said piston 81 is formed in its front portion with a broadened head 82 adapted to cooperate, through its rear face 83, with balls 84 which, in turn, may cooperate with the inner surface of sheath 33, either with the cylindrical bore 85 thereof, or with an annular groove 86 limited by shoulders 87 and 88. Inside sheath 33 is slidingly mounted a tubular jacket 89 ending, ahead, with an annular front surface 90 and, at the rear, with an annular bottom 91 provided with an external flange 92 and an internal flange 93. The latter flange is clamped between a shoulder 94 formed on piston 81, and the circular body 95 of a holding member or "spider" 96 (FIGURE 6), the external end portions of the branches 97 of which are housed, before dropping of the bomb, between a shoulder 98 (FIGURE 4) formed on an annular end piece 99 of body 36, and the edge 100 of an annular plug 101. A strong spiral spring 102, bearing against the front face of the inner flange 93, bears, on the other hand, against a shoulder 103 of piston 81, with insertion of a flat washer 133, of known material such as Teflon or the like. A spiral spring 104, having a greater diameter, is inserted between a shoulder 105 of jacket 89 and a cylindrical sheath 106 slidingly mounted around piston 81 and terminating with a tapered portion or nose 107. Piston 81 terminates, at its rear end, with a yoke member 108 to which is suspended, through crossbar 109, the connecting strap 110 to parachute P.

A longitudinal slit 130 is formed on the upper portion of body 56, for insertion of a safety pin 131 which ensures the interconnection of the sliding cap 57 and body 56 during the operations of handling, said pin being removed after the device has been mounted on the airplane.

Before dropping of the bomb, the state of end piece or nose d is that shown in FIGURE 7. Cap 57 bears, through its rounded tip 60, against bottom f of the bomb dropping gear. The sliding arrangement of cap 57 relative to body 56 enables it to compensate for differences in spacing which may occur between the upper face 132 of cover 37 and bottom f of the bomb dropping gear, to which the bomb is suspended, spring 69 being adapted to place, in all cases, the rounded tip 60 in engagement with bottom f.

If, before dropping of the bomb, for any reason, the parachute is untimely extracted—i.e. if a force is exerted on the yoke member 108 in the direction of the arrow, as shown in FIGURE 8, the spider 96 is deformed, its branches 97 being twisted at their end so as to be able to move in front of the opening provided in the annular plug 101, the broadened head 82 of piston 81 driving, through balls 84, the assembly formed by jacket 89 and sheath 106, which is evacuated relative to sheath 33 without any appreciable resistance, so that no effort is exerted on the bomb, in the non-dropped state at that moment, and consequently, on the airplane, which might unbalance the latter.

The balls 74, 76, 77, 75 partake in the interconnection of piston 81, sheath 106 and jacket 89. As long as the bomb is not dropped, the cap 57 is bearing, through the rounded tip 60, against bottom f of the bomb dropping gear. The assembly formed by fork 42 and rod 41 is unable to move under the action of spring 46, since sleeve 55 bears, through shoulder 61, against the balls 64 housed in the holes 65 of sheath 58 which forms part of body 56 secured, as by screwing, on body 36, the latter being, in turn, integral with the bomb, which, at that time, is suspended on the airplane.

Release of the bomb

When the bomb has been dropped, by opening of hooks c, it will move away from the airplane under the effect of gravity, assisted or not by an ejecting force, and the rounded-off tip 60 of cap 57 disengages from contact with bottom f. Under the action of spring 69, bearing against washer 68, itself applying against pin 66, cap 57 moves, urged by spring 46, towards the top relative to sleeve 55, until the groove 71 is placed opposite balls 64 (FIGURE 9); said balls are constantly urged outwardly, on account of shoulder 61, and become engaged in groove 71. This outward motion of balls 64 releases sleeve 55 for longitudinal movement with respect to body 56, so that, biased by spring 46, the assembly formed by sleeve 55, rod 54, rod 41 and fork 42 will undergo upward movement. The cap is locked by the balls 64 which cooperate, on one hand, with groove 71 and, on the other hand, with the holes 65 formed in sheath 58 (FIGURE 9). During this upward movement of fork 42 (FIGURE 10), seats 72 and 73 release balls 74 and 75 which are urged outwardly on account of the sloped shape of shoulder 80 (FIGURE 9) of piston 81, which is in turn urged forwardly by the action of the powerful spring 102; said shoulder cooperates with the balls 76 and 77, which thus escape from the recesses provided for them in jacket 89 and sheath 106 and drop onto the bottom 112 of casing 35 (FIGURE 10). The interlocking of sheath 106 and piston 81, which was effected by balls 74 to 77, is thus disengaged and, biased by spring 104, sheath 106 will move forwardly relative to piston 81, with its nose portion 107 engaging under the balls 84. Under the action of spiral springs 102 and 104, piston 81 and sheath 106 move forwardly up to the position shown in FIGURE 9, wherein the balls 84 are housed in groove 86 where they are maintained by nose portion 107 of sheath 106. They thus ensure the interconnection of piston 81 and the parachute secured thereto, with sleeve 33, simultaneously allowing a relative rotation of said piston and said sleeve about their common axis. As long as the parachute is not extracted, the condition is that shown in FIGURE 9, the spider 96 continuing to maintain in position jacket 89.

A split ring 134, of a springy material, is housed in a groove of piston 81 and sheath 106 presents, towards its front end, a recess 135, so that, when sheath 106 moves forwardly under the action of spring 104, the split ring 134 enters recess 135 and locks said sheath 106 onto piston 81 against longitudinal movement, such interlocking providing that the nose portion 107 forming the end of said sheath 106 is effectively inserted between the body of piston 81 and balls 84, forcing the same to remain in groove 86.

The bomb pursues its free drop as long as the extraction of the parachute has not been actuated, which may only take place after a predetermined delay in order to avoid that part of the parachute should accidentally interfere with an element of the airplane; these delaying means for the parachute extraction control will now be described in more detail.

Timing device

Figure 3:
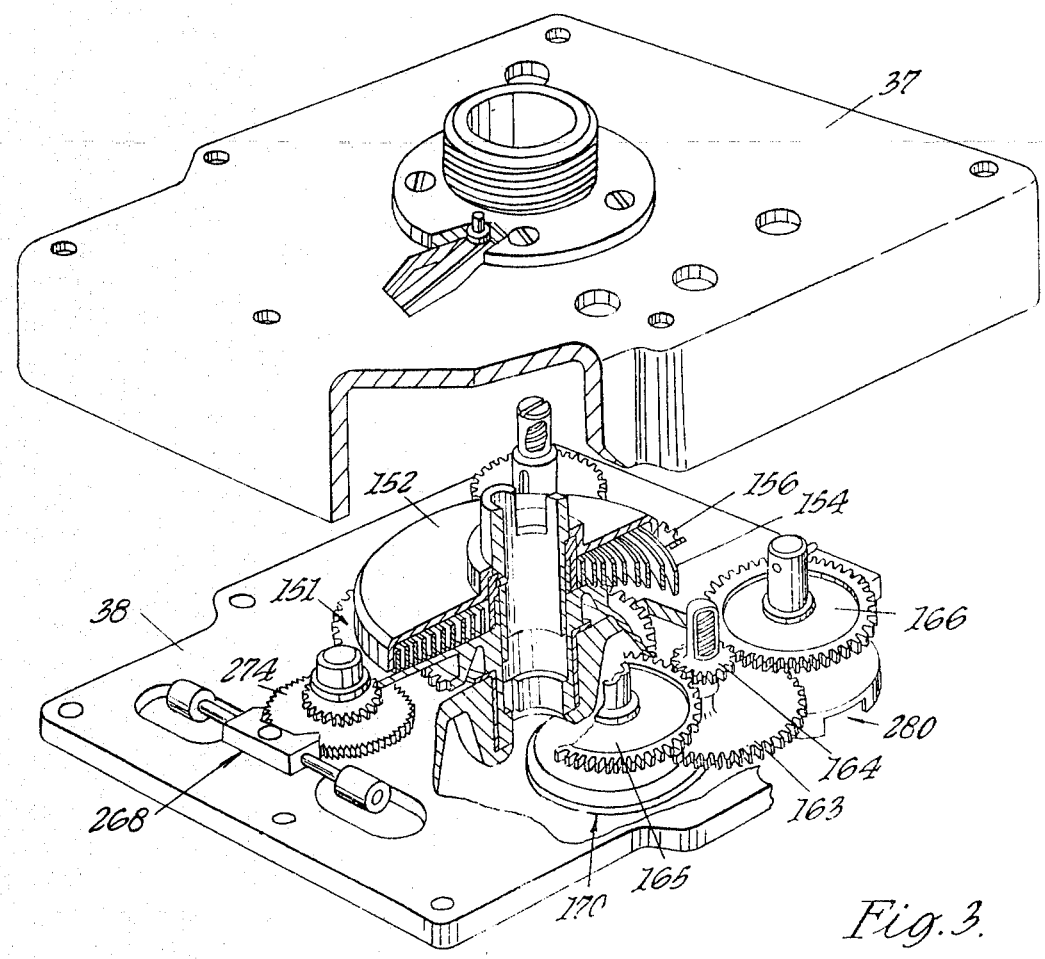
FIGURE 3 is a perspective view of the timing device, with parts broken away, showing, in an exploded manner, certain of the elements thereof.
Figure 13:
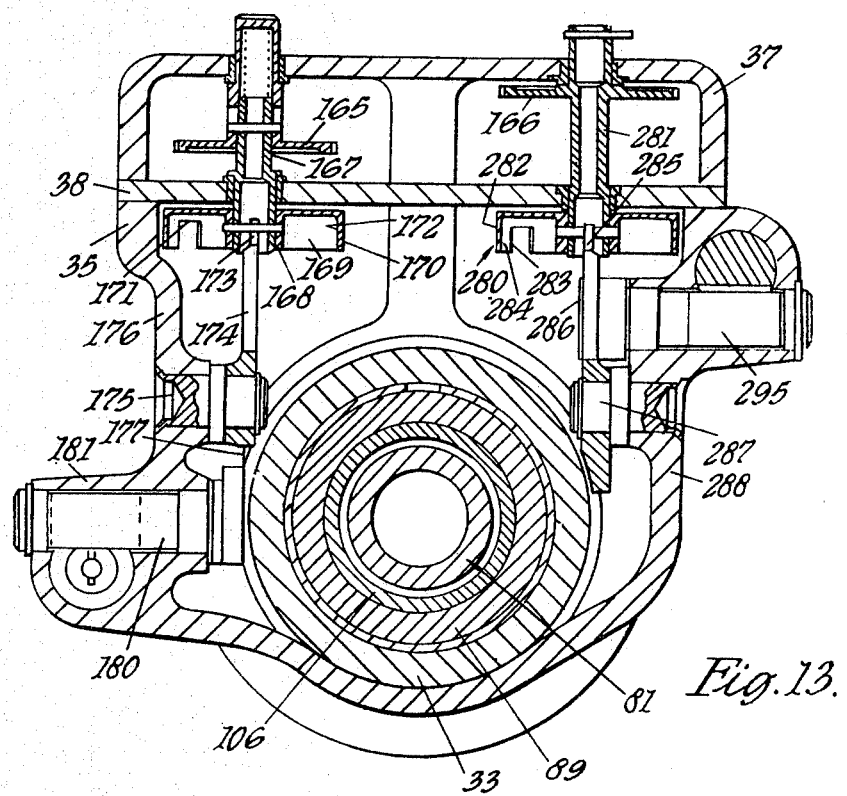
FIGURE 13 is a cross-sectional view, on an enlarged scale, along line 13—13 of FIGURE 4.

In the compartment 150 (FIGURE 10), formed between cover or cap 37 and the inserted partition 38, is located, mounted for rotation about the axis of rod 41, the main pinion 151 of a timing device, which comprises a cup member 152 with its bottom 153 housing a spiral spring 154—which acts as the motor of the timing device—secured at its external end on said cup member 152 and at its inner end to a ring 155 surrounding rod 41. The gear teeth 156 are formed on the external periphery of pinion 151 which comprises a central tubular hub 157 the lower portion 158 of which is formed with two diametrally opposite recesses 159 and 160 (FIGURE 11), wherein are located the ends of a pin 161 integral with rod 41. At its upper portion, the tubular hub 157 presents an inner surface 162 (FIGURE 12) of a greater diameter than that of the inner surface of the lower portion 158 and greater than the length of pin 161. Under these conditions, and as long as rod 41 is in the lower position, i.e. when the bomb is still attached to the airplane, pinion 151, although urged by spiral spring 154, is unable to rotate because of the engagement of pin 161 in the longitudinal recesses 159 and 160 of portion 158, which, in turn, is secured against a rotation movement about its axis. When, on the contrary, due to the upward movement of fork 42 under the action of spring 46, and after release of the bomb as explained hereinabove, pin 161 reaches the portion of the hub 157, on the inner surface of a great diameter, and said pin no longer prevents rotation of pinion 151 which is therefore initiated under the action of spiral spring 154. Teeth 156 of pinion 151 mesh with a first ring gear 163 and a second ring gear 166 (FIGURES 3 and 13).

Extraction of the parachute

Figure 14:
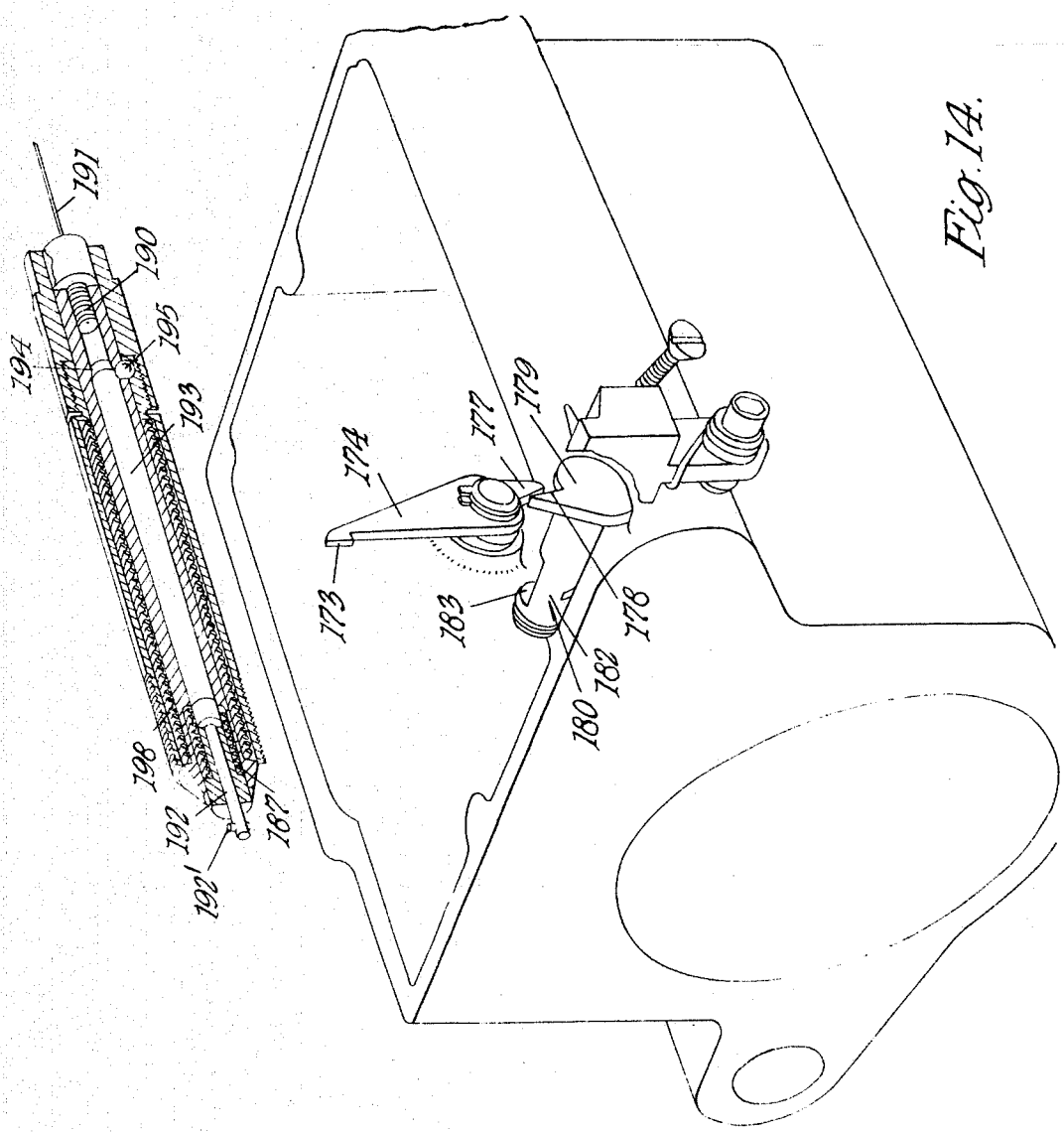
FIGURE 14 is a diagrammatic perspective view, with parts broken away and exploded, of a portion of the device according to the invention.

The ring gear 165 is carried on a tubular shaft 167 traversing the inserted partition 38 and comprises, in the compartment located under said partition—by means of its rim 168—a cup structure 169. The flange 170 of the latter is formed with a slit 171. Bearing against the inner edge 172 of flange 170 is the end portion 173 of a lever 174 mounted for rotation about an axis 175 located in the wall 176 of casing 35. Lever 174 is formed (FIGURES 13 and 14) opposite end portion 173, with a bead 177 which cooperates with a nose 178 formed on the periphery of a disk 179 which constitutes the end of a shaft 180 mounted to rotate in a boss 181 fitted in casing 35. On a portion of its length, shaft 180 presents a substantially semi-circular cross-section 182 and cooperating with the flat portion thereof 183 is the front end 184 of a plunger 185 (FIGURE 15). The latter, through its shoulder 186, is subjected to the action of a weak spring 187 which bears, on the other hand, on the inner shoulder 188 of an elongated sleeve 189 the rear opening of which is sealed by means of a threaded plug 190 on which is secured the end of a cable 191 for the control of the parachute extraction. Plunger 185 has a central duct adapted to accommodate slidingly the tapered portion 192 of a rod 193 housed in sliding relationship in the elongated sleeve 189, the rear end portion of said rod being formed with a truncated conical surface 194. In the elongated sleeve 189 there are provided recesses such as 189' arranged along a circular cross-section and wherein are accommodated balls 195 which, in the condition shown in FIGURE 15, cooperate with the cylindrical portion of rod 193. The elongated sleeve 189 is slidingly mounted in a collar 196 which, in the condition shown in FIGURE 15, tops recesses 189' of the elongated sleeve 189 and, in the spacing provided between the latter and the broadened portion of body 197, there is located a strong spring 198 applying against shoulder 199 of said body, on one hand, and, on the other hand, on an external shoulder 200 of said elongated sleeve. Body 196–197 is secured by means of screw threads to the tubular body 201–202.

Cable 191 is arranged along the container 210 of the parachute (FIGURE 16), in an envelope or cover 211 secured on a ring member 212 which in turn is attached on container 210. The projecting end 213 of said cable traverses ring member 212 through a duct 214 formed in the latter and its end portion 215 (FIGURE 17) is inserted into eyes 216 and 217 formed in flanges 218 and 219 constituting the ends of a strap 220 of resilient material, coiled circularly and located in a cavity 221 (FIGURE 16) formed in ring member 212. Said cavity 221 provides recesses 222 wherein balls 223 are located which cooperate with truncated conical flange portion 224 of a cup member 225 secured onto a plate 226, formed with a central opening 227 sealed by a washer 228. A wall plate 229 fitted with a central reinforcing washer 230 is secured on ring member 212, and a spiral spring 231 is inserted between said plate 229 and said plate 226.

The operation of the device is as follows:

The position, as illustrated in FIGURE 15, corresponds to that of the bomb before the release thereof. In this condition, the elongated sleeve 189, although subjected to the action of the powerful spring 198, is unable to move, being locked by the balls 195 partially accommodated in the thickness of said sleeve, and partially in a recess 196' of collar 196 integral with the tubular body. End portion 173 of lever 174 bears slightly against the inner face 172 of flange 170 of the cup member, under the action of the light spring 187 transmitting its effect through the front face 184 of plunger 185, the flat portion 183, nose 178 and bead 177. When the timing device is started as described hereinabove, this slight pressure does not prevent the rotation of the cup-shaped member, thus enabling the actuation of the timing device by means of a relatively light spring 154, of small size. After a predetermined interval of time, slit 171 coincides with the end portion 173 urged by spring 187; said end portion 173 passes into said slit and causes lever 174 to rotate by an angle sufficient for bead 177 to break free from nose 178. In this position, the flat portion 183 withdraws from the front face 184 of plunger 185 which, under the action of spring 187, strikes crossbar 192' at the extremity of rod 193 (FIGURE 18); The latter thus moves forwardly by an amount sufficient for the truncated conical surface 194 to be brought opposite balls 195. The latter, urged inwardly by the shape of the recess 189' of the elongated sleeve 189 wherein they are located, break free from groove 196' formed in the collar, so that the interlocking between said sleeve and the tubular body is discontinued (FIGURES 18 and 20). Urged by the powerful spring 198, the elongated sleeve 189 is projected forwardly carrying along cable 191. The end of the latter is thus released from the eyes 216 and 217 and the ends 218 and 219 of strap 220, disengaged, will move suddenly apart from one another due to the resiliency of the material the strap is made of. Balls 223, urged by the truncated-conical flange 224 forming part of cup 225 subjected to the action of spring 231, assume an outward movement (FIGURE 21) which causes said flange 224 to be released and allows the wall plate 226 to move away from ring member 212. The high aerodynamical action which will then occur against plate 226 and cup 225 will effectively assure the extraction of the parachute from its container 210.

*Control of the fuse arming*

The invention provides means adapted to assure—upon the extraction of the parachute—the arming of the fuses and more particularly the arming of the instantaneous fuse or fuses, only if the bomb has moved a sufficient distance away from the airplane to run no risk from the explosion of the bomb.

A feature of the invention lies also in the fact that the arming of a fuse may only be effected when the deceleration of the released bomb has reached and exceeded a predetermined value. Thus, account is taken not only of the opening conditions of the parachute, but, simultaneously, of the speed of the airplane, resulting in the safety conditions to automatically adapt themselves to the flight conditions.

According to the invention, the control of the arming is initiated only after a predetermined interval of time has elapsed, during which the deceleration exceeds the value set forth.

The invention provides to make use, for controlling the arming of a fuse, of the same timing device as that used for the control of the parachute extraction, to stop said timing device after the extraction control and to allow said timing device to resume its movement only after the conditions connected with the operation of the parachute have been satisfied.

Figure 25:
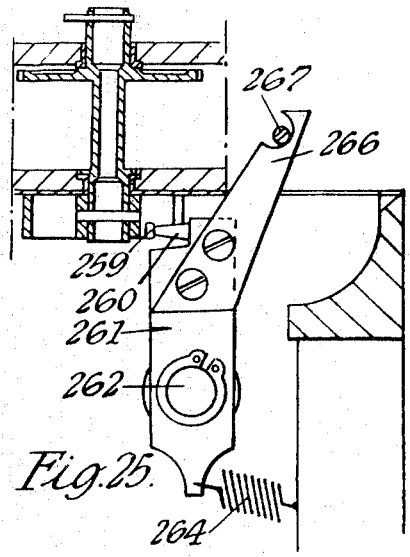
FIGURE 25 is a view similar to FIGURE 23, but for the condition shown in FIGURE 24.

The mechanism of the timing device driven by the spring comprises a disc 250 which, in the initial condition, is in the position shown in FIGURE 22. Said disc is formed, on its rim portion 249, with a recess 251 having a rectangular edge 252, 253, 254, the connection of side 252 with rim 249 being effected through a plane face 255 with a cusp 256, side 254 presenting a recess 257 forming a nose 258. With the rim 249 (FIGURE 23) of said disc cooperates a stud-shaped end portion 259 of a finger 260 carried by a block 261 mounted for rotation about axis 262 and carrying, at its opposite end 263, a calibrated spring member 264 secured, at its other end, to a fixed point 265. Said block carries in addition a hook 266 adapted to cooperate with the end portion 267 of a balance beam 268 mounted for rotation about axis 269 and the body 270 of which is formed with tips or noses 271-272 adapted to cooperate with teeth 273 of a pinion 274, thus providing an anchor-escapement regulator. In the initial condition shown in FIGURES 22 and 23, stud 259 cooperates with the plane face 256, so that disc 250 is able to rotate. After a certain amount of rotation of disc 250, corresponding to a sufficiently extended movement of the timing device for the latter to permit the parachute extraction, finger 260 presents itself opposite recess 251 and, urged by spring 264, engages inside the recess (FIGURES 24 and 25). For instance, three tenths of a second after starting the timing device, the cup-shaped member 169 for the control of the parachute will move its slit 171 opposite lever 174. The latter engages into said slit 171, initiating the release of the parachute. Only a tenth of a second later will the small tip 259 terminating finger 260 fall into recess 251 with a rectangular contour. This is the condition corresponding to FIGURE 24. In this condition, balance beam 268, which forms part of the anchor-escapement device, engages pinion 274 corresponding thereto and blocks the timing device.

If the parachute opens normally, a sufficiently high deceleration will occur for the block 261 with the tipped finger 260 to move away, against the action of spring 264, sufficiently apart from the recessed disc 250 (FIGURE 23) to allow the timing device to resume its rotation.

If, immediately after the resuming of the rotation of the timing device, the parachute is torn apart, the deceleration effect ceases and the action of the spring 264 becomes again preponderant and, since recess 251 is still facing tip end piece 259, finger 260 carried by block 261 will drop again into recess 261, blocking again the timing device through the same action as described above.

Figure 27:
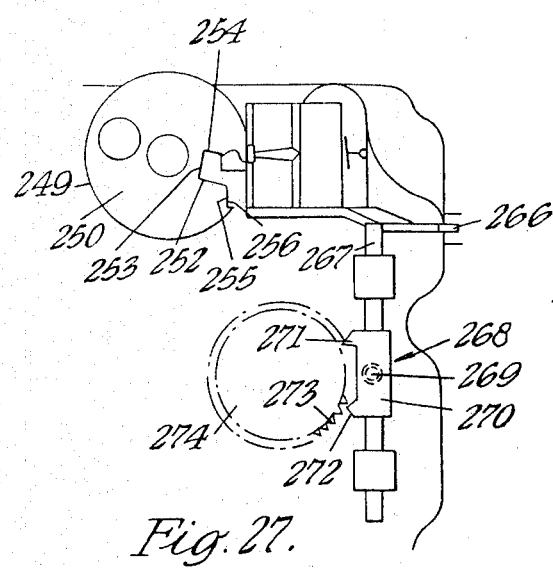
FIGURE 27 is a view similar to FIGURES 22 and 24, but for still another condition.

If the parachute is not torn up, disc 250 passes in front of finger 260 carrying tip end piece 259, supported, in turn, by block 261, the position being then as shown in FIGURE 27. From this instant onwards, the timing device cannot be stopped any more and the arming of the fuse may then be actuated. It is to be stressed that, in case the tearing of the parachute does occur, this will take place immediately upon its opening up.

Figure 26:
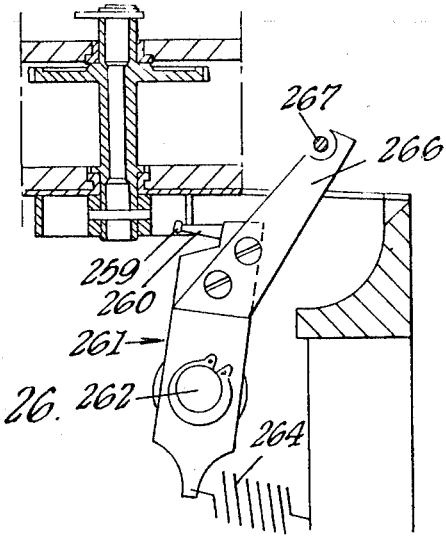
FIGURE 26 is a view similar to FIGURE 25, but for a still different condition.

Should the deceleration be lower than a predetermined value, which is the case for instance, for an incomplete opening of the parachute or for an insufficient speed of the airplane, the action on the block piece, while being sufficient to restore the anchor-escapement balance beam to a position such as to enable again the operation of the timing device, is however insufficient to completely release the tip end piece 259 from recess 251 (FIGURE 26). Under these conditions, therefore, the timinig device will resume its function, but will be blocked after a predetermined time has elapsed which may be, for instance, of the order of four tenths of a second, by means of one of walls 254 of recess 251 bearing against head 259 of finger 260 carried by block piece 261. In this case, the timing device stops and the fuses cannot be armed.

Figure 28:
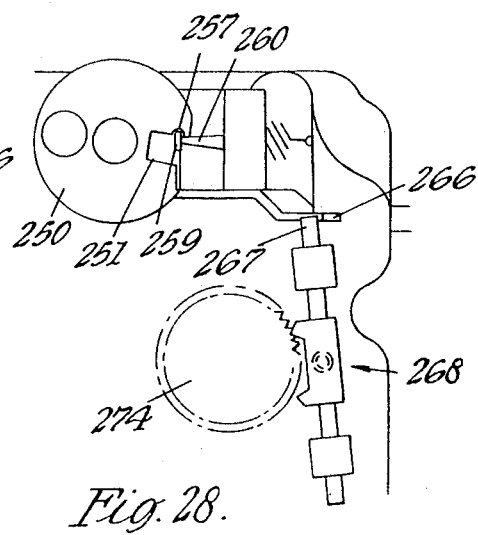
FIGURE 28 is a view similar to FIGURE 27, but for still another condition.
Figure 29:
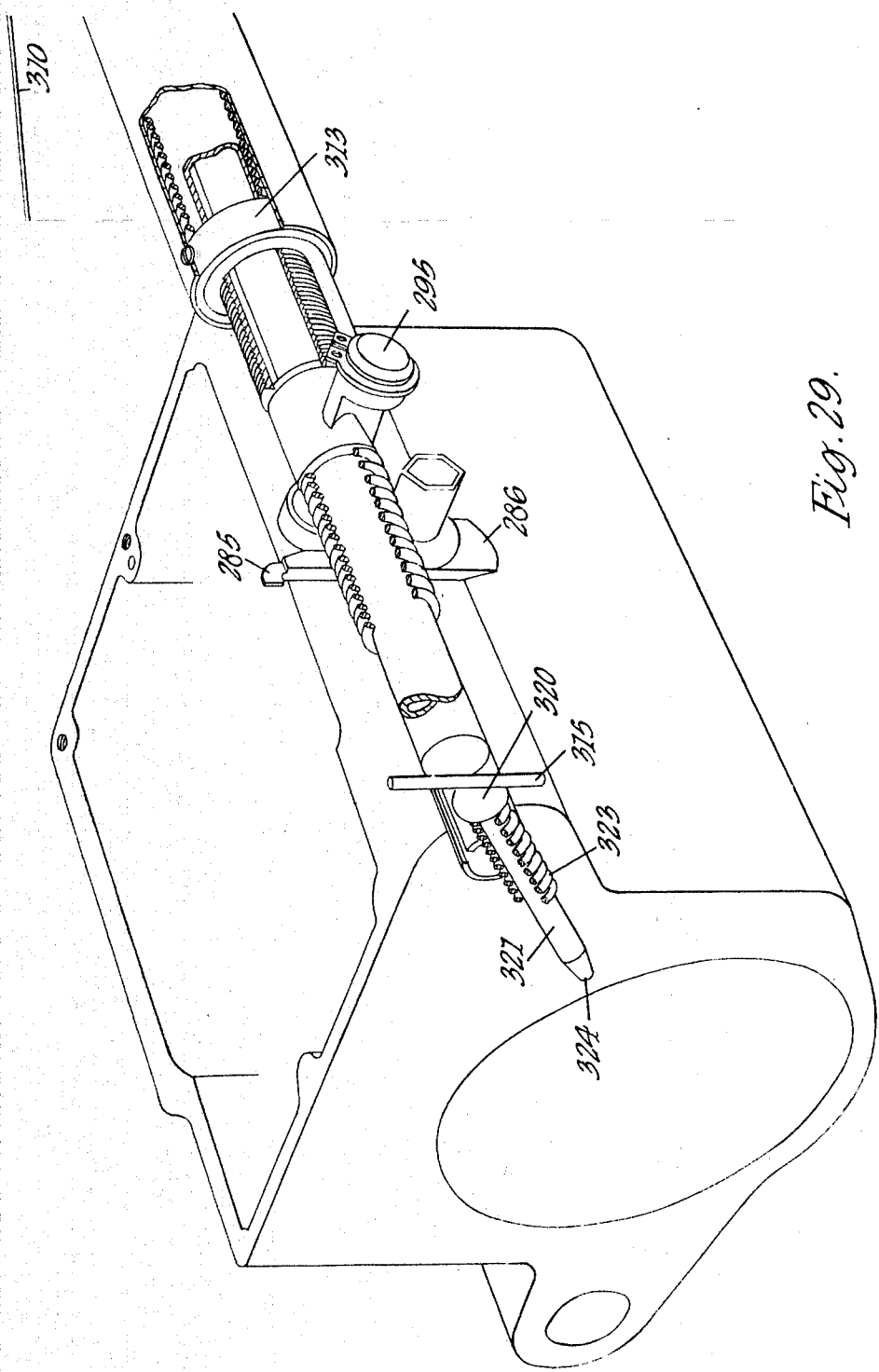

In the event of an impact with the ground or of the occurrence of a high accidental deceleration, there is no risk for said finger to leave recess 251, since head 259 is arranged to fall down into slit 257 (FIGURE 28).

If no provision of an escapement beam 268 for stopping the timing device were made, the end of finger 260 would undergo the action of a force which would be that of the spring 154 of said timing device and a reaction would occur which might prevent the release of said finger from said disc, in spite of the application of a sufficiently high deceleration.

*Control of the fuse arming*

The timing mechanism comprises a cup or dish-shaped member 280 (FIGURE 13) carried by the axis 281 of pinion 166 and the edge 282 of said member is formed with a recess 283. Cooperating with the inner face 284 of said edge is the end portion 285 of a lever 286 mounted for rotation about an axis 287 carried by wall 288 of casing 35. Said end portion 285 of lever 286 bears against the inner face 284 of edge 282 through the action of a light spring 289 (FIGURE 30) bearing against an inner shoulder 290 of body 291 and which is effective to apply against an external shoulder 292 of a plunger 293 cooperating with a semi-circular cross-sectional portion 294 of a shaft 295 mounted for rotation in casing 35 and which carries a disc cooperating with a bead or nose of lever 286. Plunger 293 terminates rearwardly with a restricted land portion 301 slidingly engaged into a tubular tube 302 slidingly mounted in an inner ring member having two diameters 303, the portion of greater diameter of which is formed with recesses for accommodating balls 304, thus held in position by plug 302, the smaller diameter portion 305 serving to guide plunger 293. On the broadened portion of plug 302 is slidingly mounted body 306 of a cap 307 formed with a shoulder 308 the rear face of which cooperates with balls 304, said cap carrying a rear wall 309 with an opening in its protruding portion relative to the cap wherein is threaded the end of arming cable 310 of a fuse and which terminates with a ring 311. On the front face of shoulder 308 urges a powerful spring 312 bearing, on the other hand, against a shoulder 313 integral with a tubular body 291. The latter is traversed by a pin 315 located in a slot 316 formed in the front portion of plunger 293 in order to prevent the rotation of the latter.

As long as the extremity 285 of lever 286 is not opposite the slit 283, the condition of the arrangement is that shown in FIGURE 30. Said end portions 285 bears with a reduced force due to the light spring 289 against edge 282, without substantially preventing the rotation of the cup member 280, allowing the driving of the timing device by means of a spring of small size.

When end portion 285 coincides with slit 283, facing the latter, lever 286 pivots about its axis 287 and the semi-circular sectional portion 294 retracts from the front of plunger 293 (FIGURE 31). The plunger will thus move from left to right, in a translational movement, as shown in FIGURE 31 and its front face 318 will strike the front face of plug 302. As shown in FIGURE 32, said plug is mounted in sliding relationship with ring member 305 and passes in front of the balls 304 to release the latter which drop then, under the action of the shoulder 308 which is urged by spring 312, into the space left open between the plug and the ring. This falling of the balls off their recesses unlocks cap 307 so that the latter, urged by the powerful spring 312, is projected rearwardly carrying along cable 310, so that the pull action effected by the latter through its other end assures the arming of a fuse. Ring 311 allows an initial adjustment of the length of cable 310.

*Arming of the cap fuse*

In the condition shown in FIGURE 33, plunger 293 cooperates, through its rear end, with the rounded-off head 320 of a rod 321 located slidingly in a radial bore 322 provided in the casing and urged by a spring 323. The other end of 324 of said rod is engaged in a groove 325 formed in a unit 326 mounted in sliding longitudinal relationship and urged by a spring, the sliding motion causing the arming of the cap fuse. As long as plunger 293 is in the position shown in FIGURE 30, the sliding of the unit 326 is prevented by abutting against end portion 324. On the contrary, upon the plunger 293 moving rearwardly, urged by spring 289 which, on one hand, and as previously shown, controls the arming of the instantaneous fuse, rod 321 moves outwardly urged by spring 323, thus releasing the sliding unit 326, which assures the arming of the cap fuse.

What is claimed is:

1. A device for an aerial bomb equipped with a parachute, comprising: means for releasably attaching an aerial bomb to an airplane, a parachute container on said bomb at the rear end thereof, a parachute in said container, a sliding mechanism connecting the bomb and the parachute, locking means engageable with the sliding mechanism to selectively lock the same and means secured to the bomb for contacting the airplane when the bomb is attached thereto and for being free of the airplane with the bomb released, the latter means being coupled to the locking means to cause locking of the sliding mechanism when the bomb is released from the airplane and to unlock the sliding mechanism when the bomb is attached to the airplane.

2. A device for an aerial bomb equipped with a parachute, comprising: means for releasably securing an aerial bomb to an airplane, a parachute container on the rear end portion of the bomb, a parachute in said container, sliding means between said container and the bomb in sliding relationship with the bomb and coupled to said parachute, interlocking means cooperating with said sliding means and said bomb to lock the sliding means with said bomb, said interlocking means being inoperative as long as the bomb is secured to the airplane, interlocking control means comprising a projecting feeler member resiliently urged towards the airplane and in abutting contact with the same as long as the bomb remains attached thereto, said feeler member being operatively associated with the interlocking means such that upon displacement of the feeler member relative to the bomb after release of the same from the airplane, said interlocking means is rendered operative.

3. A device according to claim 2, comprising means between said sliding means and the bomb which is retractable under the action of tensile stress resulting from the opening of the parachute.

4. A device according to claim 2, wherein said feeler member is slidingly mounted for movement perpendicular to the sliding motion of said sliding means relative to the bomb.

5. A device for an aerial bomb adapted for being equipped with a parachute and releasably mounted on an airplane comprising: a bomb body, means for releasably attaching the bomb body to an airplane for jettisoning the bomb, a retractable feeler member having a retracted position with the bomb body secured to the airplane and being extended when the bomb body is jettisoned, a parachute container at the rear portion of the bomb body, a parachute in said container, sliding means coupled to the parachute between the bomb body and container, retractable interlocking means between said sliding means and said bomb body, means for controlling the interlocking of the sliding means from said feeler member only when the latter is in the extended position, timing means for controlling the opening of the container, locking means for said timing means operative as long as said feeler member is in the retracted position and becoming inoperative when said feeler member is in its extended position at the release of the bomb body.

6. A device according to claim 5 comprising means at the front of said container coupled to the timing means for controlling opening of the container to permit extraction of the parachute.

7. A device according to claim 6 wherein said means for controlling opening of the container includes means for locking the container in a closed condition and means coupled to the timing means for unlocking the locking means after a predetermined period of time of operation of the timing means.

8. A device according to claim 7, wherein the means controlling opening of the container includes a spring maintaining such means under resilient tension, while the unlocking control means also includes a spring under resilient tension, the former spring having a greater intensity than the latter spring.

9. A device according to claim 8, wherein the timing means comprises a slotted cup and the unlocking control means comprises a lever resiliently urged against said slotted cup for activating the unlocking control means when the lever enters a slot in the cup.

10. A device according to claim 5 wherein said bomb has a primable fuse and the device further comprises means controlled by the timing device for priming the fuse of the bomb.

11. A device according to claim 10 comprising means responsive to the deceleration of the bomb after release thereof from the airplane to stop the timing means and prevent priming of the fuse if the deceleration does not attain a predetermined value.

12. A device according to claim 11 wherein said means for stopping the timing means include a device rendering said means inoperative during a first portion of the operation of the timing means at the end of which the container is opened.

13. A device according to claim 11 wherein said timing means includes an anchor-escapement, said means for stopping the timing means being coupled to the anchor-escapement to block the timing means if the deceleration does not attain a predetermined value.

14. A device for an aerial bomb having an instantaneously primable fuse and adapted for being equipped with a parachute, comprising: an envelope containing a bomb, a parachute container at the rear end of said envelope, a parachute in said container, means for initiating extraction of the parachute at a predetermined interval of time after the release of the device from the airplane, timing means, inertia means for locking the operation of the timing means as long as the deceleration due to the opening of the parachute does not attain a predetermined value, means for locking the priming of a detonating fuse of the bomb, and means for releasing said locking means after the timing means has operated a predetermined interval of time.

15. A device according to claim 14, wherein the timing means comprises an anchor-escapement with an oscillating beam, said inertia means being operatively associated with said beam to maintain the same in the locking position of the timing means if the deceleration does not exceed a predetermined value.

16. A device for an aerial bomb releasable from an airplane and having a primable fuse and a parachute, comprising: an envelope, a bomb inside said envelope, and forming therein a rear compartment, a parachute container in said rear compartment at the rear end portion thereof and adapted for receiving a parachute, means between said container and the bomb for controlling operation of the bomb and including a timing device, means for locking the timing device as long as the device has not been released from the airplane, means coupled to said timing device for controlling the opening of the container and extraction of a parachute therefrom, means for priming the fuse of the bomb, means for locking the priming action of the fuse and means for controlling unlocking thereof after a predetermined period of operation of the timing device, means for stopping the timing device following the starting thereof, the latter said means becoming inoperative only if the deceleration of the jettisoned device maintains a value exceeding a predetermined value during a predetermined period of time.

17. A device according to claim 16, wherein said stopping means remains locked if at the end of a predetermined time the deceleration is lower than said predetermined value.

18. A device according to claim 16, wherein said stopping means comprises a generally circular roller secured on the timing device, a head finger cooperating with said roller and subjected to a resilient calibrated action, said roller having a slot therein with a width that exceeds that of said finger.

19. A device according to claim 18, wherein said slot is formed with two substantially radial faces, one radial face cooperating with said finger and presenting an attachment shoulder for said finger.

20. A device according to claim 18, wherein said finger head carries blocking means of an anchor-escape beam of the timing device.

21. A device according to claim 16, wherein the means for controlling the priming comprises resilient tension means acting on the control means for the priming of the fuse to urge the same to active position, means for blocking said control means in a non-priming position and means for unblocking said blocking means controlled from said timing device.

References Cited by the Examiner
UNITED STATES PATENTS

| | | | |
|---|---|---|---|
| 2,377,587 | 6/1945 | Strong | 102—4 |
| 2,709,961 | 6/1955 | Klas | 102—4 |
| 2,723,876 | 11/1955 | Langlois et al. | 102—4 X |
| 2,796,284 | 6/1957 | Benson et al. | 102—4 X |
| 2,845,024 | 7/1958 | Greene | 102—4 |
| 2,969,212 | 1/1961 | Martin | 102—78 X |
| 3,087,695 | 4/1963 | Potts | 102—4 X |

BENJAMIN A. BORCHELT, *Primary Examiner.*
SAMUEL W. ENGLE, *Examiner.*